(12) United States Patent
Kasperovics et al.

(10) Patent No.: US 11,449,550 B2
(45) Date of Patent: Sep. 20, 2022

(54) AD-HOC GRAPH DEFINITION

(71) Applicant: SAP SE, Walldorf (DE)

(72) Inventors: Romans Kasperovics, Speyer (DE); Gerald Franz, Walldorf (DE); Bastian Erler, Walldorf (DE); Hannes Jakschitsch, Walldorf (DE); Roland Sedler, Leimen (DE); Florian Schimmel, Rauenberg (DE)

(73) Assignee: SAP SE, Walldorf (DE)

( * ) Notice: Subject to any disclaimer, the term of this patent is extended or adjusted under 35 U.S.C. 154(b) by 241 days.

(21) Appl. No.: 16/793,796

(22) Filed: Feb. 18, 2020

(65) Prior Publication Data
US 2021/0256063 A1 Aug. 19, 2021

(51) Int. Cl.
*G06F 16/901* (2019.01)
*G06F 16/22* (2019.01)
*G06Q 10/06* (2012.01)

(52) U.S. Cl.
CPC ...... *G06F 16/9024* (2019.01); *G06F 16/2282* (2019.01); *G06Q 10/06* (2013.01)

(58) Field of Classification Search
CPC .................................................. G06F 16/9024
See application file for complete search history.

(56) References Cited

U.S. PATENT DOCUMENTS

2016/0342709 A1* 11/2016 Fokoue-Nkoutche ....................... G06F 16/2255
2017/0147705 A1* 5/2017 Kasperovics ....... G06F 16/2433
2017/0364534 A1* 12/2017 Zhang .................. G06F 16/284

* cited by examiner

*Primary Examiner* — Nan H Oberly
(74) *Attorney, Agent, or Firm* — Mintz Levin Cohn Ferris Glovsky and Popeo, P.C.

(57) ABSTRACT

A method, a system, and a computer program product for generating graphs using a stored procedure. One or more graph data tables are generated. A procedure having a predetermined name is generated. One or more inputs to the generated procedure includes the generated one or more graph data tables. The generated procedure includes one or more graph objects. The graph data tables are configured to be input to the graph objects. The generated procedure is stored. The stored generated procedure is executed using one or more graph data stored in a graph database.

20 Claims, 8 Drawing Sheets

AD-HOC GRAPH DEFINITION

TECHNICAL FIELD

This disclosure relates generally to data processing and, in particular, to querying graph data from a relational database, and more particularly, ad-hoc graph definition from input tables in a stored procedure.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items.

By contrast, a relational database may store the relationships between different data items implicitly, for example, by organizing the data items into one or more database tables. Each database table may store a set of data items referred to as a relation. Furthermore, the rows of the database table may hold individual data items while the columns of the database table may hold the attributes that are present in each of the data items. Meanwhile, relationships between data items residing in different database tables may be implicitly defined by cross referencing the key that is associated with each data item in the relational database. For instance, a first database table may store the keys of data items from a second database table, thereby linking data items held in two separate database tables. Alternately and/or additionally, data items from the first database table and the second database table may be linked via a third database table storing the keys of data items from both the first database table and the second database table.

SUMMARY

In some implementations, the current subject matter relates to a computer-implemented method for generating graphs using a stored procedure. The method may include generating one or more graph data tables, and generating a procedure having a predetermined name. One or more inputs to the generated procedure may include the generated one or more graph data tables. The generated procedure may include one or more graph objects. The graph data tables may be configured to be input to the graph objects. The method may further include storing the generated procedure, and executing, using one or more graph data stored in a graph database, the stored generated procedure.

In some implementations, the current subject matter may include one or more of the following optional features. Execution of the stored generated procedure may be configured to include inserting the graph data stored in the graph database 108 into the generated graph tables (e.g., vertex tables, edge tables, etc.), and executing the stored generated procedure using the inserted graph data. In some implementations, the graph data tables may include at least one of the following: one or more vertex tables, one or more edge tables, and any combination thereof.

In some implementations, execution of the stored generated procedure may be further configured to include calling the stored generated procedure using predetermined name (e.g., adhocGraphExample).

In some implementations, the method may include executing, using one or more another graph data stored in the graph database, the stored generated procedure. The other graph data may be different from the graph data that may have been used during previous call of the procedure.

In some implementations, the generated procedure may be generated using one or more graph workspace objects. Further, the graph data may include at least one of the following: one or more vertices, one or more edges, and any combination thereof.

In some implementations, the method may further include executing one or more graph algorithms using the one or more graph data objects. The graph algorithms may include at least one of the following: a user-defined graph algorithm, a built-in graph algorithm, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

A relational database may be configured to store a graph by at least storing the corresponding graph data in a vertex table and an edge table. For example, storing the graph in the relational database may include storing, in the vertex table, the vertices of the graph including, for example, the keys and the attributes associated with each vertex. Furthermore, storing the graph in the relational database may include storing, in the edge table, the edges of the graph including, for example, the keys and the attributes associated with each edge.

In some implementations, the current subject matter may be configured to generate ad-hoc graph definition(s) using input tables in a stored procedure. In particular, a graph object may be generated using table parameters, where parameters may include a table containing vertices with an identifier, a table containing edges with an identifier, data related to source and data related to target. The current subject matter may be configured to remove a necessity of static dependencies for graph objects and may allow dynamic graph object generation. As such, more general procedures may be possible by influencing graph objects through procedure parameters.

Figure 1:
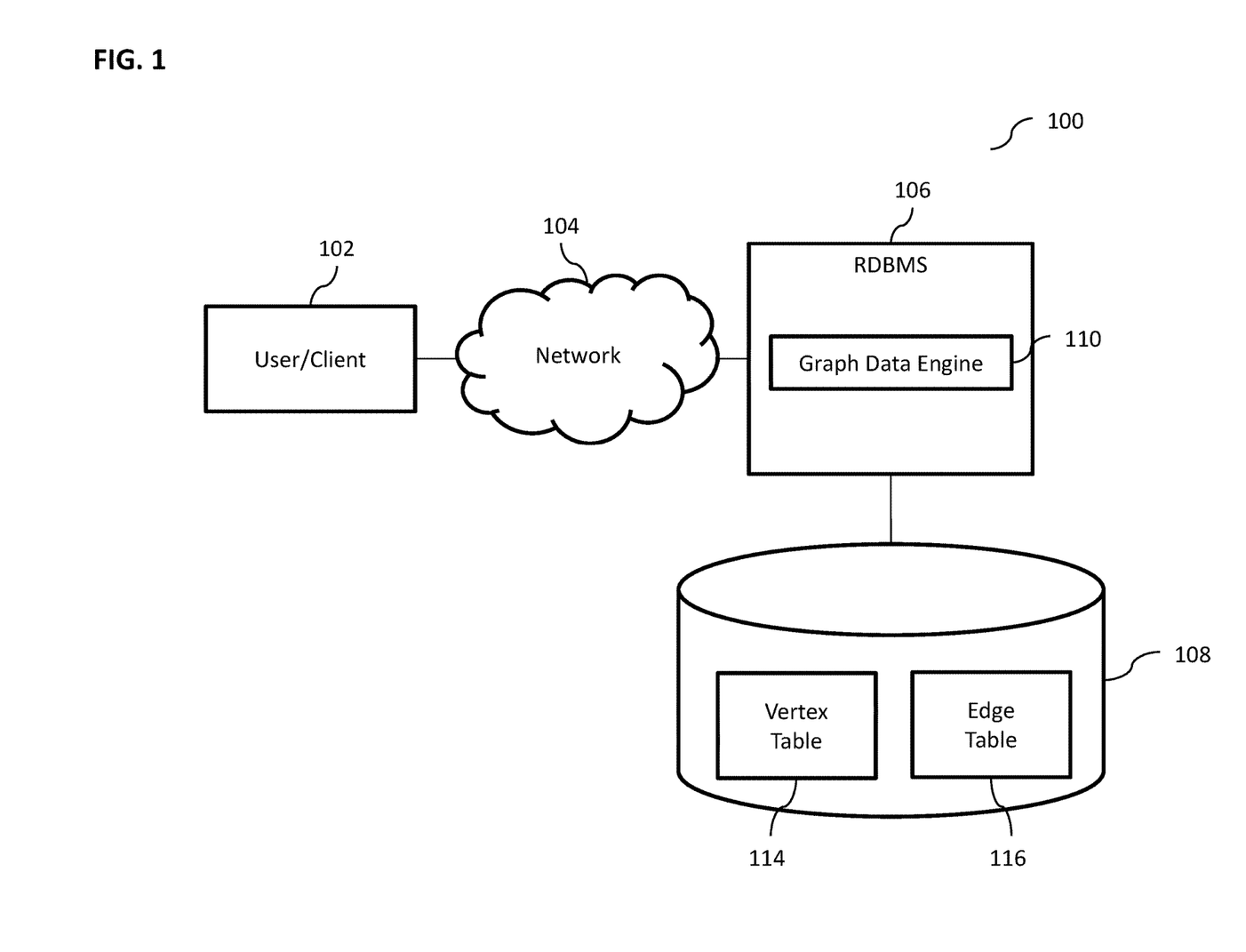
FIG. 1 illustrates a system diagram illustrating a data storage system, according to some implementations of the current subject matter.

FIG. 1 illustrates a system diagram illustrating a data storage system 100, according to some implementations of the current subject matter. The system 100 may include a relational database management system (RDBMS) 106, a database 108 storing graph data, and a user/client 102. In some implementations, the database 108 may be a relational database configured to store graph data, for example, in a vertex table 114 and/or an edge table 116. The database 108 may be any type of database including, for example, an in-memory database, a hierarchical database, an object database, an object-relational database, a non-Structured Query Language (NoSQL) database, and/or the like. The database 108 may be a graph database, a column store, a key-value store, a document store, and/or the like.

The database 108 may be communicatively coupled with the relational database management system 106 that may include a graph data engine 110. The database management system 106 may be configured to respond to requests from one or more users 102 of the data storage system 100. The user 102 may communicate with the database management system 106 via a network 104, which may be any wired and/or wireless network including, for example, a public land mobile network (PLMN), a wide area network (WAN), a local area network (LAN), a virtual local area network (VLAN), the Internet, and/or the like. The user 102 may send to the database management system 106 a request to execute, on at least a portion of the graph data stored in the database 108, a graph algorithm including, for example, shortest path, risk propagation, minimum flow, page rank, and/or the like. A graph algorithm may be any algorithm that derives a solution by operating on graph data which may include vertices interconnected by one or more directed and/or undirected edges. The graph algorithm may be any predefined graph algorithm and/or a custom graph algorithm defined by the user 102. In some implementations, the graph data may be constructed from one or more tables and may be stored in the database 108.

In response to the request from the user 102, the graph data engine 110 (which may include one or more processors and/or memory) of the relational database management system 106 may be configured to generate an interface for accessing data from one or more tables stored in the database 108. The graph data engine 110 may be configured to execute the graph algorithm of the request by querying the graph data stored in the database 108 to obtain the desired results. The generated interface may be used to present results responsive to the user 102's request. The results may be arranged in a tabular format. The tabular arrangement of the results may be queried using one or more SQL queries (including, but not limited to, table, view, etc. functions).

Figure 2:
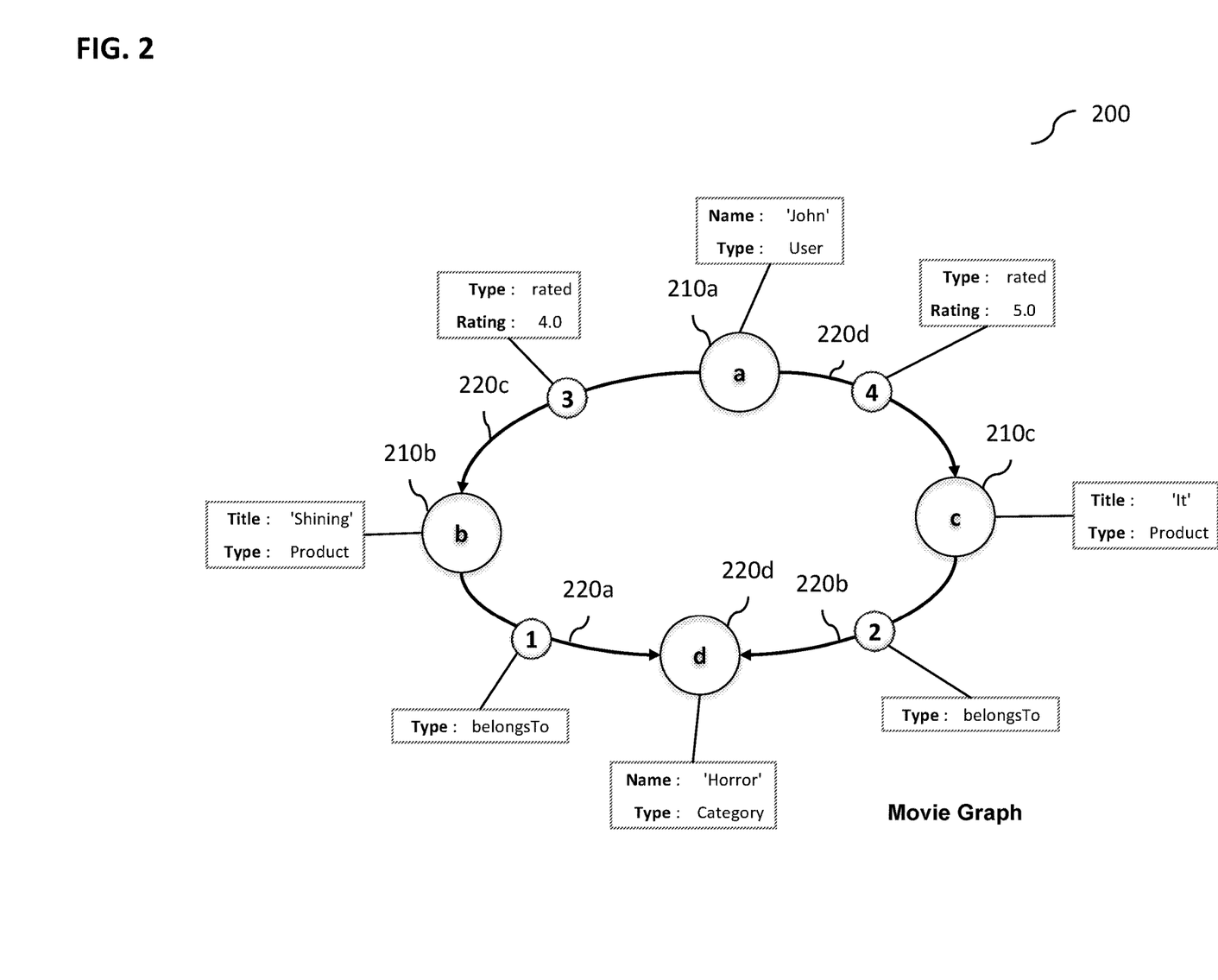
FIG. 2 illustrates an exemplary graph data, according to some implementations of the current subject matter.

FIG. 2 illustrates an exemplary graph data 200 (e.g., showing a movie graph data) that may be stored in the database 108 and may be requested by the user 102, according to some implementations of the current subject matter. The graph data 200 may be stored in the database 108 in the vertex table 114 and/or the edge table 116. The graph data 200 may include a plurality of vertices including, for example, a first vertex 210*a*, a second vertex 210*b*, a third vertex 210*c*, and a fourth vertex 210*d*. Further, the plurality of vertices may be interconnected via a plurality of directed edges: a first edge 220*a*, a second edge 220*b*, a third edge 220*c*, and a fourth edge 220*d*.

Each vertex and/or edge in the graph data 200 may be associated with a key that uniquely identifies the corresponding vertex and/or edge. For example, the first vertex 210*a* may be associated with the key "a," the second vertex 210*b* may be associated with the key "b," the third vertex 210*c* may be associated with the key "c," and the fourth vertex 210*d* may be associated with the key "d." The first edge 220*a* may be associated with the key "1," the second edge 220*b* may be associated with the key "2," the third edge 220*c* may be associated with the key "3," and the fourth edge 220*d* may be associated with the key "4." Each vertex and/or edge in the graph data 200 may also be associated with one or more attributes. For example, each of the first vertex 210*a*, the second vertex 210*b*, the third vertex 210*c*, and the fourth vertex 210*d* may be associated with a "Title" attribute and a "Type" attribute. Each of the first edge 220*a*, the second edge 220*b*, the third edge 220*c*, and the fourth edge 220*d* may be associated with a "Type" attribute and/or a "Rating" attribute.

In some implementations, the user 102 may send to the relational database management system 106 a request to execute a graph algorithm on the graph data 200. In response to the request, the graph data engine 110 may be configured to generate an interface for accessing data from one or more tables stored in the database 108. In particular, the graph data engine 110 may be configured to execute a query of the graph data stored in the database 108 to obtain the desired results responsive to the request. The graph data engine 110 may be further configured to generate a specific query on a graph data stored in the database 108 that may be used to read data from tables stored in the database 108. The generated interface may then be used to present results responsive to the user 102's request. The results may be arranged in a tabular format, which may be used for execution of one or more SQL queries.

In some implementations, one or more stored procedures may be used and/or called, where called procedures may be configured to use ad-hoc graph definitions implementing tabular input parameters, for executing built-in and/or user-defined graph algorithms on them. The following illustrates an exemplary generation of a graph that may use tables (e.g., vertex and/or edge tables) as input to a stored procedure. The graph generation may be initiated by generating or creating type(s) for vertex and/or edge table(s) as follows:

CREATE TYPE VertexTable AS TABLE (
    id INTEGER);
    CREATE TYPE EdgeTable AS TABLE (
    id INTEGER,
    source INTEGER,
    target INTEGER);

In some implementations, table type creation may be optional. Alternatively, a table type may be specified, such as, by referring to an existing catalog table. Tables that are matching specific table type, may be configured to be automatically legitimate parameters for the stored procedure and/or function.

Each table (vertex and edge) may be identified using its respective identifier values (id) and the edge table(s) may also include values for source and target data values of a graph. The process may then proceed to generate separate vertex tables and edge tables that may be used as inputs in a stored procedure. The vertex tables (in this example, there are two vertex tables) may be generated as follows:

Create Table vTable1 like VertexTable;
    Create Table vTable2 like VertexTable;

The edge tables (again, in this example, there are two edge tables) may be generated in accordance with the format defined above, as follows:

Create Table eTable1 like EdgeTable;
    Create Table eTable2 like EdgeTable;

Once the tables are generated, they may be populated with respective values. In this example, the first vertex table may be populated using the following three vertices values (1), (2) and (3)

INSERT INTO vTable1 (id) VALUES (1);
    INSERT INTO vTable1 (id) VALUES (2);
    INSERT INTO vTable1 (id) VALUES (3).

The edge tables may be populated with values defining edges between each vertex values, i.e., (1→2), (2→3), and (3→1), as follows:

INSERT INTO eTable1 (id, source, target) VALUES (1,1,2);
    INSERT INTO eTable1 (id, source, target) VALUES (2,2,3);
    INSERT INTO eTable1 (id, source, target) VALUES (3,1,3).

Another set of vertex and edge tables may be populated in a similar fashion (here, there are four vertices), as follows:

INSERT INTO vTable2 (id) VALUES (1);
    INSERT INTO vTable2 (id) VALUES (2);
    INSERT INTO vTable2 (id) VALUES (3);
    INSERT INTO vTable2 (id) VALUES (4);
    INSERT INTO eTable2 (id, source, target) VALUES (1,1,2);
    INSERT INTO eTable2 (id, source, target) VALUES (2,2,3);
    INSERT INTO eTable1 (id, source, target) VALUES (3,1,3);
    INSERT INTO eTable2 (id, source, target) VALUES (4,2,1).

The populated vertex and edge tables may be used as input parameters in a procedure that may be generated and then stored for later use/reuse. The procedure may be used to generate a graph based on table data (e.g., vertex, edge, neighboring data, etc.). For example, a procedure may be generated or created in the following exemplary way:

```
CREATE PROCEDURE adhocGraphExample
(IN vTable VertexTable,IN eTable EdgeTable, out res Int)
LANGUAGE GRAPH READS SQL DATA AS
BEGIN
    Graph g = Graph(:eTable, "SOURCE", "TARGET", "ID", :vTable,
    "ID");
    res = 0;
    FOREACH v IN VERTICES(:g)
    {
        if(COUNT(NEIGHBORS(:g, :v, 1,1))>1L)
        {
            res = :res+1;
        }
    }
END
```

The above procedure may be used to determine values of neighboring elements. The procedures uses vTable VertexTable and eTable EdgeTable corresponding to vertex and edge tables, respectively, as inputs. Both tables may be generated/populated using the processes discussed above. Using these tables as inputs, the above procedure may be configured to generate/create a graph, where, for each vertex v, results of the NEIGHBORS function may be dependent on the graph that is eventually generated/created.

Once the procedure is generated/created, it may be stored. The stored procedure may be used to generate neighbor nodes results using one or more of the following expressions (e.g., the first expression below may be used to generate one node results, and the second expression may be used to generate two node results):

CALL adhocGraphExample(vTable1, eTable1, ?);
    CALL adhocGraphExample(vTable2, eTable2, ?).

Figure 3:
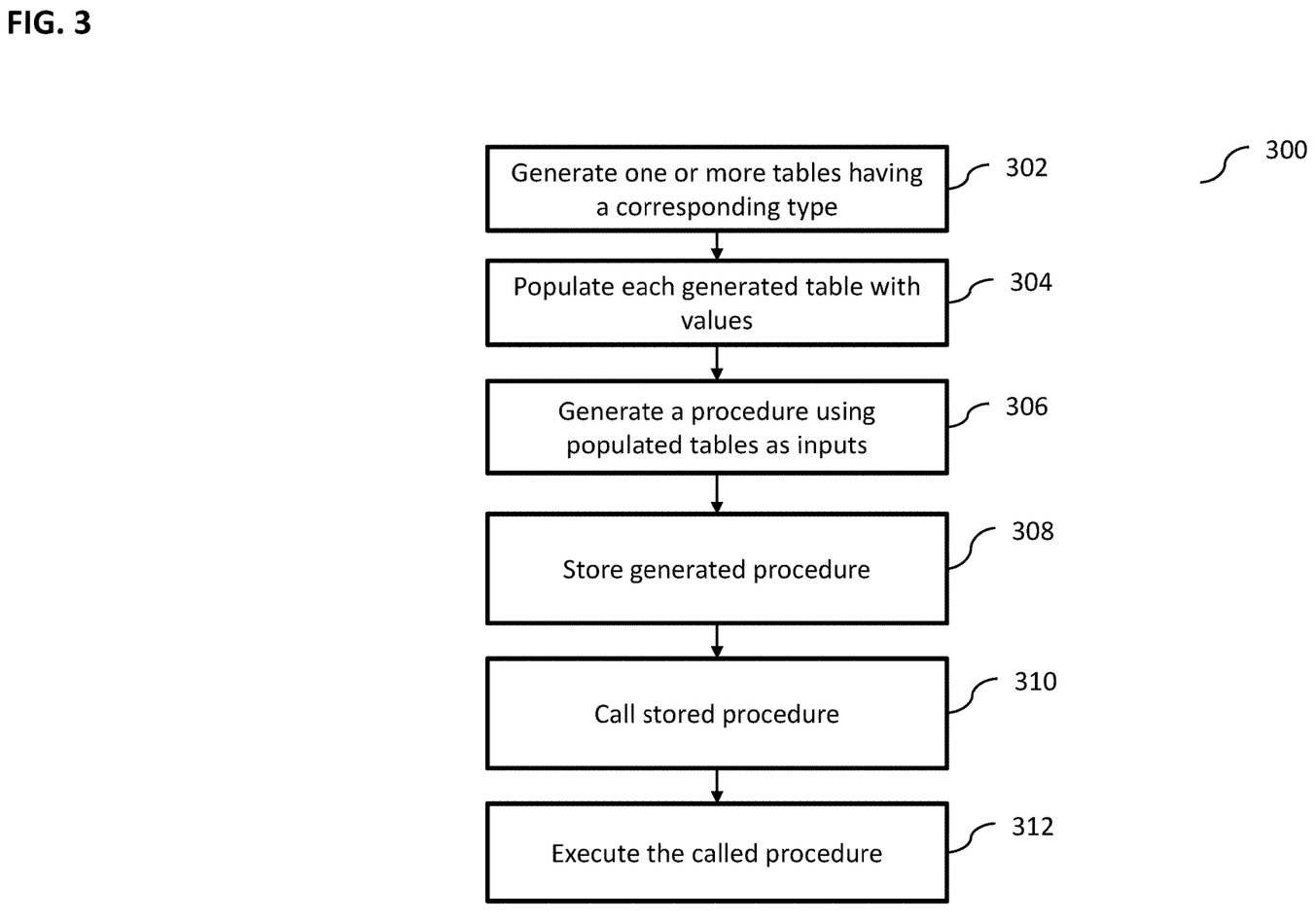
FIG. 3 illustrates an exemplary process for generating a graph using a stored generated procedure, according to some implementations of the current subject matter.

FIG. 3 illustrates an exemplary process 300 for generating a graph using a stored generated procedure, according to some implementations of the current subject matter. The process 300 may be performed using the database management system 106 in response to a request from the client 102 to execute a graph algorithm on graph data stored in the database 108, for example, in the vertex table 114 and/or the edge table 116.

At 302, the database management system 106 may be configured to respond to a request from the user 102 to execute a request to generate a graph using one or more stored procedures and using data stored in the database 108. In particular, the system 106 may be configured to generate and/or create one or more tables having a table type (e.g., a vertex table, an edge table, etc.). The system 106 may be configured to determine graph data that may be required to execute this request. In an exemplary implementation, the database management system 100 may receive, from the user 102, a request to execute a graph algorithm on the graph data 200 (shown in FIG. 2), which may be stored in the database 108 coupled with the database management system 106. The graph algorithm may be any algorithm that derives a solution by operating on the graph data 200 including, for example, shortest path, risk propagation, minimum flow, page rank, and/or the like. As noted, the user 102 may request the database management system 106 to execute a predefined graph algorithm and/or a custom graph algorithm defined, for example, by the user 102.

At 304, the database management system 106 may be configured to insert and/or populate each of the generated tables with distinct table values (e.g., vertices, edges, etc.).

Figure 4:
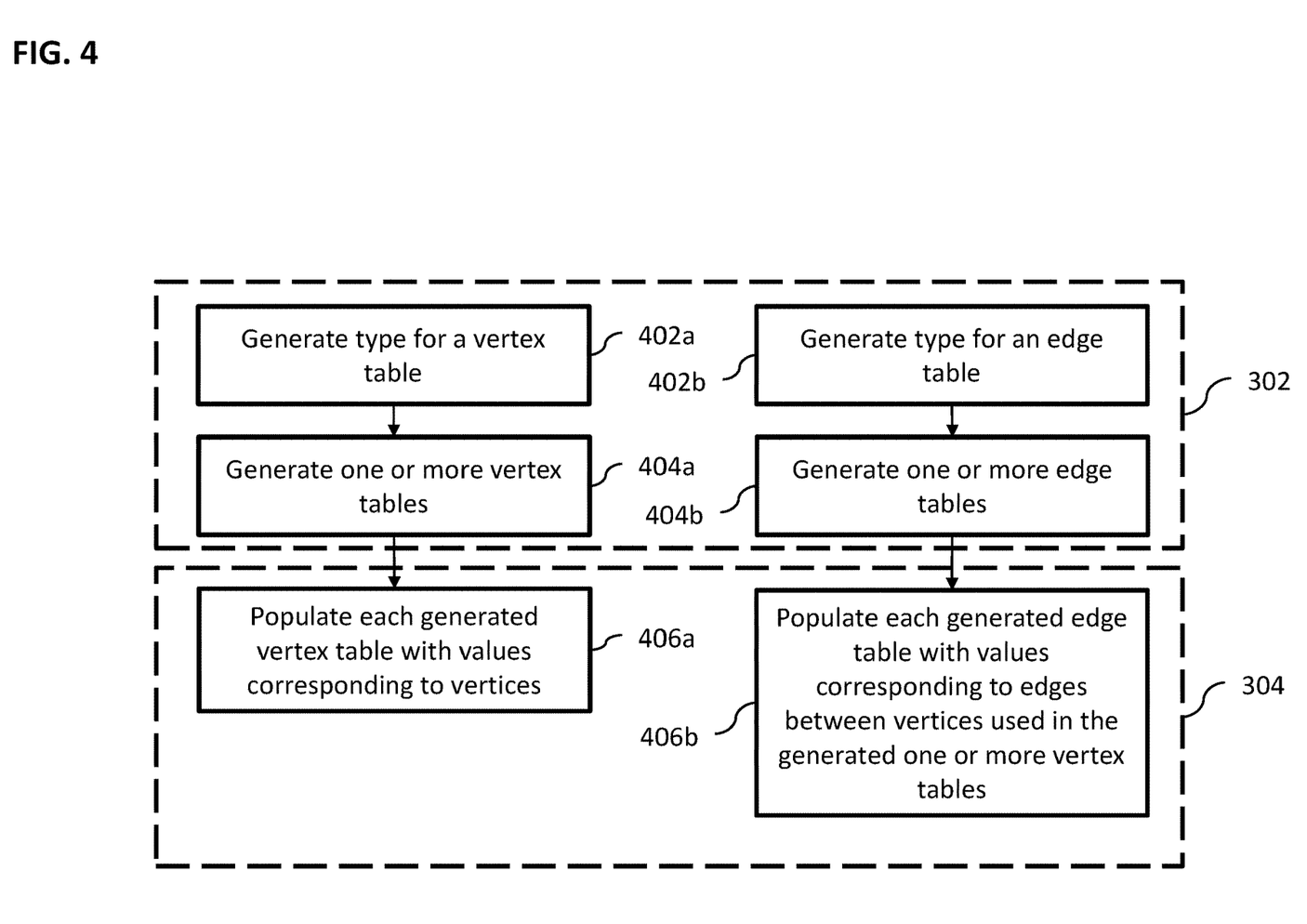
FIG. 4 illustrates exemplary details of the process of generating tables of specific type (as shown at 302 in FIG. 3, according to some implementations of the current subject matter.

FIG. 4 illustrates exemplary details of the process of generating tables of specific type (e.g., as shown at 302 in FIG. 3) and inserting corresponding values (e.g., as shown at 304 in FIG. 3). Each portion of the operations 302 and 304, as shown in FIG. 4, may occur simultaneously and/or in a particular order. As shown in FIG. 4, processes designated by operations 402a, 404a, and 406a ("vertex table branch") may be configured to be performed in connection with vertex table generation/population, and processes designated by operations 402b, 404b, and 406b ("edge table branch") may be configured to be performed in connection with edge table generation/population.

Referring to the vertex table branch of FIG. 4, at 402a, one or more types for one or more vertex tables may be generated and/or created (and/or one or more vertex tables having the same type may be generated and/or created). For example, as shown above, this may be accomplished using the following expression: CREATE TYPE VertexTable AS TABLE (id INTEGER). Similarly, as shown by the edge table branch in FIG. 4, at 402b, one or more type for one or more edge tables may be generated and/or created (and/or one or more edge tables having the same type may be generated and/or created). For example, as is again shown above, this may be accomplished using the following code: CREATE TYPE EdgeTable AS TABLE (id INTEGER, source INTEGER, target INTEGER).

At 404a, one or more vertex tables may be generated and/or created. This may be accomplished using a Create Table expression (e.g., Create Table vTable1 like VertexTable; Create Table vTable2 like VertexTable). At 404b, one or more corresponding edge tables may be generated and/or created using similar expression (e.g., Create Table eTable1 like EdgeTable; Create Table eTable2 like EdgeTable). The above tables may be distinct and may be configured to be differently identified (e.g., using appropriate identifiers) as well as define different relationships between source data values and target data values.

Once the vertex and edge tables are created, corresponding values may be inserted into those tables, at 406a and 406b, respectively. In particular, vertex tables may be populated with vertices data (e.g., for vTable1: INSERT INTO vTable1 (id) VALUES (1); INSERT INTO vTable1 (id) VALUES (2); etc.; for vTable2: INSERT INTO vTable2 (id) VALUES (1); INSERT INTO vTable2 (id) VALUES (2); etc.). The generated edge tables may be populated with appropriate edges connecting vertices that may have been inserted in the vertex tables (e.g., for eTable1: INSERT INTO eTable1 (id, source, target) VALUES (1,1,2); INSERT INTO eTable1 (id, source, target) VALUES (2,2,3); etc.; for eTable2: INSERT INTO eTable2 (id, source, target) VALUES (1,1,2); INSERT INTO eTable2 (id, source, target) VALUES (2,2,3); etc.). Once the vertex and edge tables have been populated with appropriate values, the processing may continue with generating or creating a procedure that may be configured to use the populated tables, at 306, as shown in FIG. 3.

The procedure may be created using a CREATE PROCEDURE statement, as for example, shown above. The statement may define inputs for the procedure as the defined populated tables (e.g., vertex and edge tables, as generated above at 302, 304, respectively). When called, the procedure may be configured to generate a graph using the one or more tables. The procedure may call specific generated tables by their identifiers (e.g., ID) and identify Source and Target data values. Each created procedure may be designed to generate any desired graph. In some implementations, a created procedure may be designed to be define one or more ad-hoc graphs from input tables and may be configured to execute one or more built-in and/or user-defined algorithms on such graphs.

In some implementations, a graph workspace object may be used to define a particular procedure (e.g., GRAPH WORKSPACE, as available in High Performance Analytic Appliance ("HANA") system developed by SAP SE, Walldorf, Germany) object. A graph object may be a catalog object that may define a graph in terms of tables and columns: a vertex table, an edge table, a key column in the vertex table, a key column in the edge table, a source vertex column in the edge table, a target vertex column in the edge table, and/or any combination thereof. A graph object may be uniquely identified by a database schema it resides in and a workspace name. Multiple graph instances may be included in the same schema (e.g., with different workspace names) and/or different database schemas. Graph information may be stored in the system view (e.g., GRAPH WORKSPACES as available in the HANA system developed by SAP SE, Walldorf, Germany). In some exemplary implementations, the graph workspace object may be an existing and/or previously defined graph workspace object that may be stored in the database 108 (or in any other storage or memory location). For example, a prior request to access graph data stored in the database 108 may have resulted in generation of a graph workspace object, thereby allowing system 106 to reuse the defined graph workspace object, such as for the purposes of defining the above procedure, as discussed above.

Referring back to FIG. 3, at 308, the created procedure may be stored so that it may be used and/or reused in the future, such as, for example, when a call is received from a user 102 to generate a graph on an ad-hoc basis from one or more tables stored in the system 100. The database management system 106 may be configured to store the generated procedure. Alternatively, or in addition to, the created procedure may be stored in one or more memory locations.

At 310, the created procedure may be called by the user. The procedure may be called for the purposes of generating a graph and/or executing one or more built-in and/or user-defined graph algorithms on it. The call may be configured to identify the procedure by a name that was assigned to it at the graph procedure creation process (e.g., adhocGraphExample). The call may be configured to identify tables as inputs to the procedure call (e.g., vTable1, eTable1, vTable1, eTable2). In some exemplary implementations, as discussed above, the syntax of the call procedure may be as follows: CALL adhocGraphExample(vTable1, eTable1, ?). Once the procedure is called, it may be executed by the database management system 106, at 312.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 5:
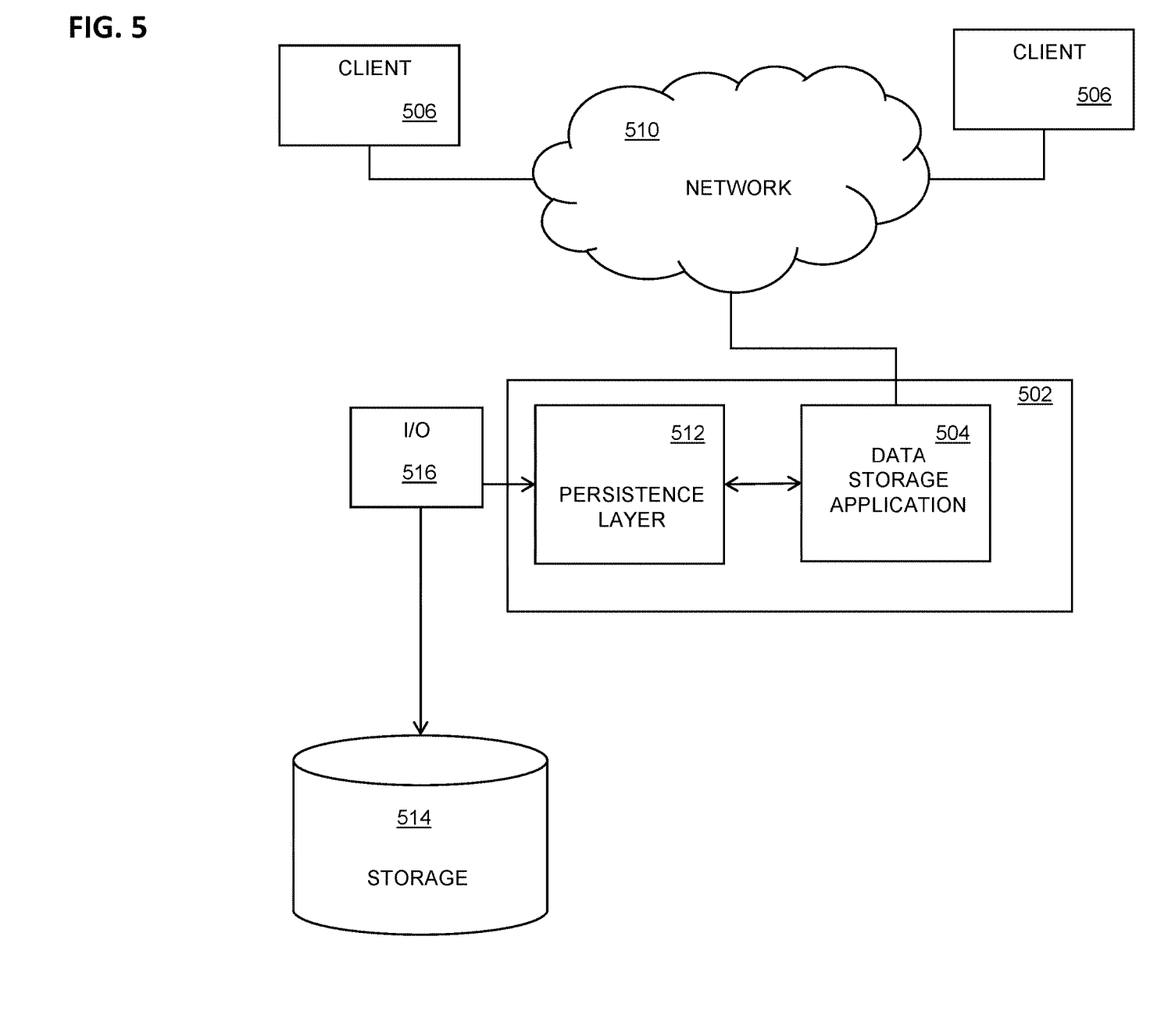
FIG. 5 is a diagram illustrating an exemplary system including a data storage application, according to some implementations of the current subject matter.

FIG. 5 illustrates an exemplary system 500 in which a computing system 502, which may include one or more programmable processors that may be collocated, linked over one or more networks, etc., executes one or more modules, software components, or the like of a data storage application 504, according to some implementations of the current subject matter. The data storage application 504 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 502 as well as to remote users accessing the computing system 502 from one or more client machines 506 over a network connection 510. One or more user interface screens produced by the one or more first modules may be displayed to a user, either via a local display or via a display associated with one of the client machines 506. Data units of the data storage application 504 may be transiently stored in a persistence layer 512 (e.g., a page buffer or other type of temporary persistency layer), which may write the data, in the form of storage pages, to one or more storages 514, for example via an input/output component 516. The one or more storages 514 may include one or more physical storage media or devices (e.g. hard disk drives, persistent flash memory, random access memory, optical media, magnetic media, and the like) configured for writing data for longer term storage. It should be noted that the storage 514 and the input/output component 516 may be included in the computing system 502 despite their being shown as external to the computing system 502 in FIG. 5.

Data retained at the longer term storage 514 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 6:
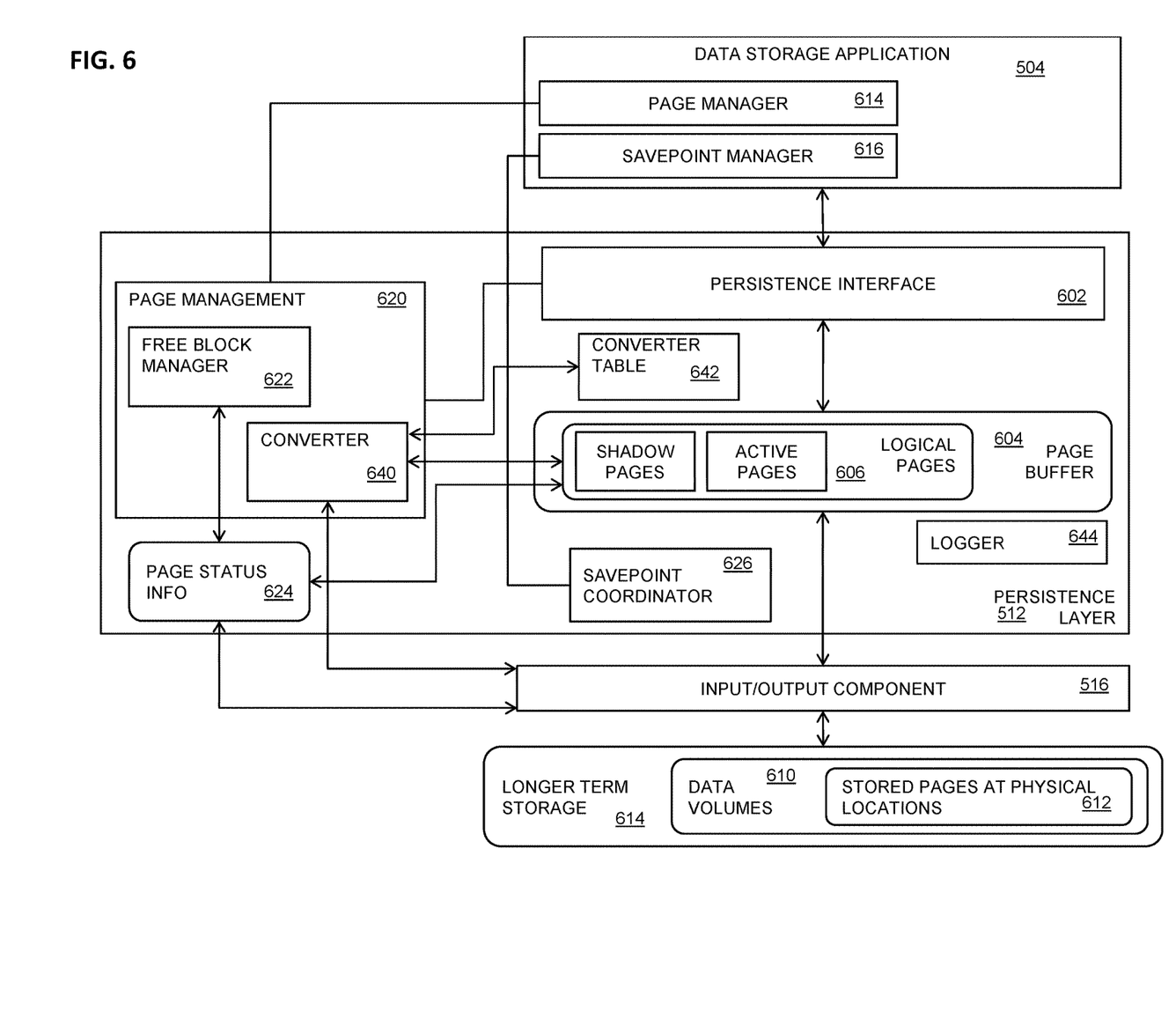
FIG. 6 is a diagram illustrating details of the system of FIG. 5.

FIG. 6 illustrates exemplary software architecture 600, according to some implementations of the current subject matter. A data storage application 504, which may be implemented in one or more of hardware and software, may include one or more of a database application, a network-attached storage system, or the like. According to at least some implementations of the current subject matter, such a data storage application 504 may include or otherwise interface with a persistence layer 512 or other type of memory buffer, for example via a persistence interface 602. A page buffer 604 within the persistence layer 512 may store one or more logical pages 606, and optionally may include shadow pages, active pages, and the like. The logical pages 606 retained in the persistence layer 512 may be written to a storage (e.g. a longer term storage, etc.) 514 via an input/output component 516, which may be a software module, a sub-system implemented in one or more of software and hardware, or the like. The storage 514 may include one or more data volumes 610 where stored pages 612 are allocated at physical memory blocks.

In some implementations, the data storage application 504 may include or be otherwise in communication with a page manager 614 and/or a savepoint manager 616. The page manager 614 may communicate with a page management module 620 at the persistence layer 512 that may include a free block manager 622 that monitors page status information 624, for example the status of physical pages within the storage 514 and logical pages in the persistence layer 512 (and optionally in the page buffer 604). The savepoint manager 616 may communicate with a savepoint coordinator 626 at the persistence layer 512 to handle savepoints, which are used to create a consistent persistent state of the database for restart after a possible crash.

In some implementations of a data storage application 504, the page management module of the persistence layer 512 may implement a shadow paging. The free block manager 622 within the page management module 620 may maintain the status of physical pages. The page buffer 604 may include a fixed page status buffer that operates as discussed herein. A converter component 640, which may be part of or in communication with the page management module 620, may be responsible for mapping between logical and physical pages written to the storage 514. The converter 640 may maintain the current mapping of logical pages to the corresponding physical pages in a converter table 642. The converter 640 may maintain a current mapping of logical pages 606 to the corresponding physical pages in one or more converter tables 642. When a logical page 606 is read from storage 514, the storage page to be loaded may be looked up from the one or more converter tables 642 using the converter 640. When a logical page is written to storage 514 the first time after a savepoint, a new free physical page is assigned to the logical page. The free block manager 622 marks the new physical page as "used" and the new mapping is stored in the one or more converter tables 642.

The persistence layer 512 may ensure that changes made in the data storage application 504 are durable and that the data storage application 504 may be restored to a most recent committed state after a restart. Writing data to the storage 514 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 644 may also be included to store the changes made to the data of the data storage application in a linear log. The logger component 644 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 644 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 512 may use a combination of undo log entries (from one or more logs) and shadow paging.

The persistence interface 602 may handle read and write requests of stores (e.g., in-memory stores, etc.). The persistence interface 602 may also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 644 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 644 may write a database log (or simply referred to herein as a "log") sequentially into a memory buffer in natural order (e.g., sequential order, etc.). If several physical hard disks/storage devices are used to store log data, several log partitions may be defined. Thereafter, the logger 644 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 504 may use shadow paging so that the savepoint manager 616 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 7:
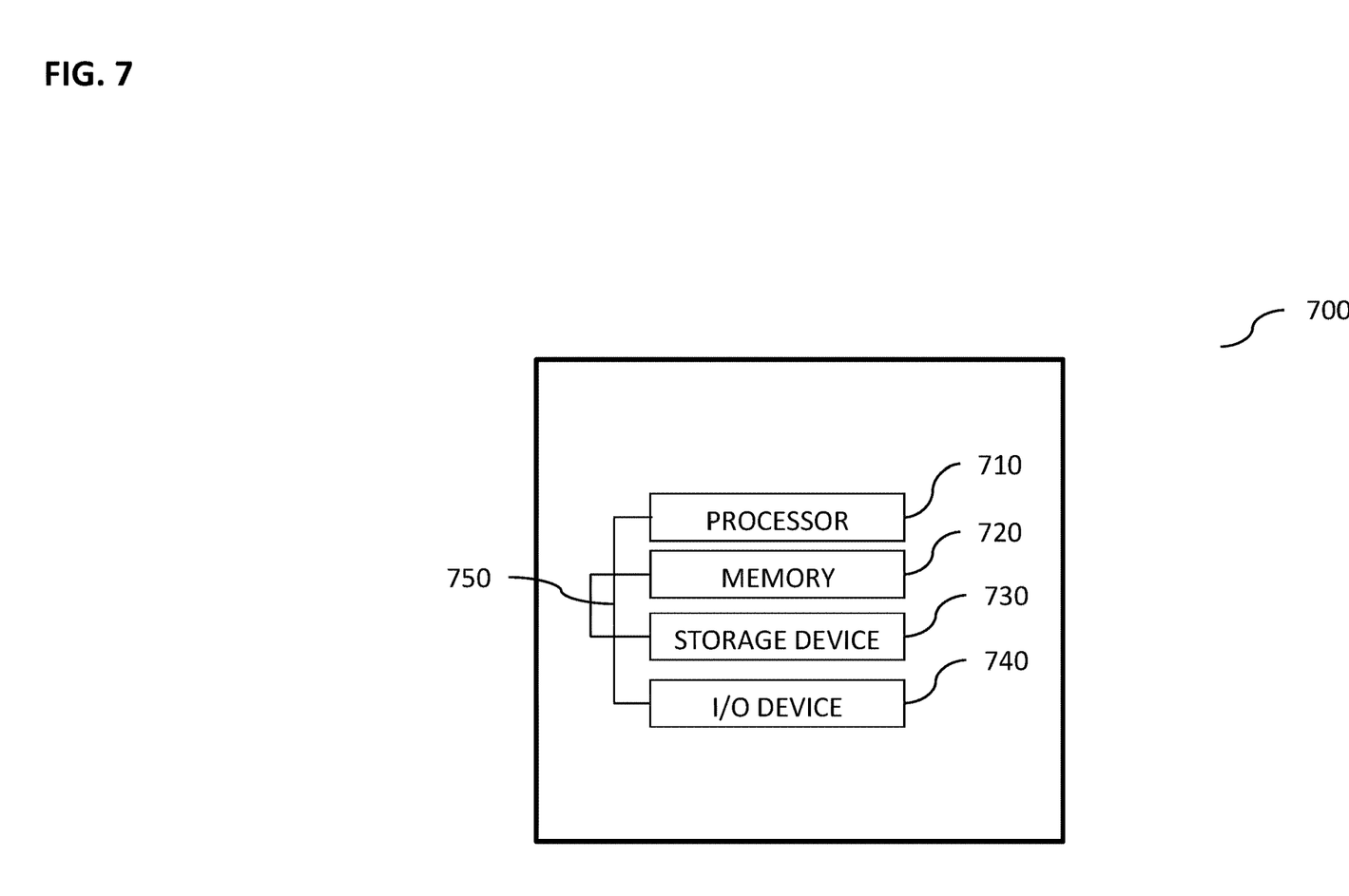
FIG. 7 is an exemplary system, according to some implementations of the current subject matter.

In some implementations, the current subject matter may be configured to be implemented in a system 700, as shown in FIG. 7. The system 700 may include a processor 710, a memory 720, a storage device 730, and an input/output device 740. Each of the components 710, 720, 730 and 740 may be interconnected using a system bus 750. The processor 710 may be configured to process instructions for execution within the system 700. In some implementations, the processor 710 may be a single-threaded processor. In alternate implementations, the processor 710 may be a multi-threaded processor. The processor 710 may be further configured to process instructions stored in the memory 720 or on the storage device 730, including receiving or sending information through the input/output device 740. The memory 720 may store information within the system 700. In some implementations, the memory 720 may be a computer-readable medium. In alternate implementations, the memory 720 may be a volatile memory unit. In yet some implementations, the memory 720 may be a non-volatile memory unit. The storage device 730 may be capable of providing mass storage for the system 700. In some implementations, the storage device 730 may be a computer-readable medium. In alternate implementations, the storage device 730 may be a floppy disk device, a hard disk device, an optical disk device, a tape device, non-volatile solid state memory, or any other type of storage device. The input/output device 740 may be configured to provide input/output operations for the system 700. In some implementations, the input/output device 740 may include a keyboard and/or pointing device. In alternate implementations, the input/output device 740 may include a display unit for displaying graphical user interfaces.

Figure 8:
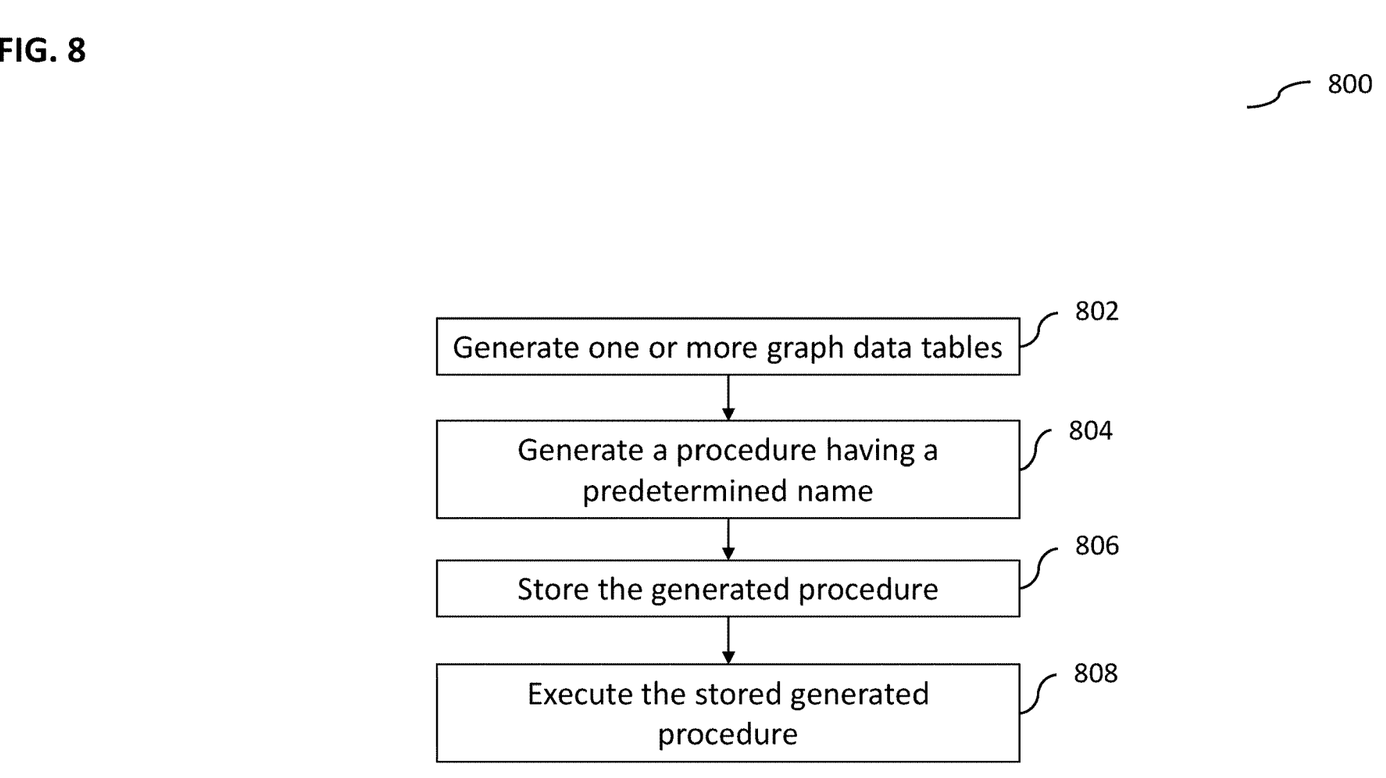
FIG. 8 is an exemplary method, according to some implementations of the current subject matter.

FIG. 8 illustrates an exemplary method 800 for generating graphs using a stored procedure, according to some implementations of the current subject matter. The process 800 may be configured to be executed by the system 100 shown in FIG. 1, and in particular, the database management system 106. At 802, one or more graph data tables may be generated. Generation of tables may include defining one or more types (e.g., vertex, edge, etc.) for the tables as well as providing identifiers, source and target information. Tables may then be generated using the created types of data. Generation of tables may be performed based on a request to build a graph on an ad-hoc basis using graph data stored in a relational database (e.g., database 108 shown in FIG. 1).

At 804, a procedure having a predetermined name (e.g., adhocGraphExample) may be generated and/or created. In some implementations, one or more inputs to the generated procedure may include the generated graph data tables. The generated procedure may include one or more graph objects, where the generated graph data tables may be configured to be input to the one or more graph objects. In some implementations, the ad-hoc graph definition may be configured to be only available within the generated procedure. The procedure may be configured to apply one or more built-in and/or user defined graph algorithms on such graphs. The algorithms may be configured to return a result, e.g., a graph, a single value (e.g., the graph diameter, an average vertex degree, etc.), a table (e.g., a list of vertices within 3-hop-neighborhood of a particular vertex, etc.), and/or any combination thereof.

The generated procedure may be stored, at 806. The stored procedure may then be executed using one or more graph data stored in a graph database, at 808.

In some implementations, the current subject matter may include one or more of the following optional features. Execution of the stored generated procedure may be configured to include inserting the graph data stored in the graph database 108 into the generated graph tables (e.g., vertex tables, edge tables, etc.), and executing the stored generated procedure using the inserted graph data. In some implementations, the graph data tables may include at least one of the following: one or more vertex tables, one or more edge tables, and any combination thereof.

In some implementations, execution of the stored generated procedure may be further configured to include calling the stored generated procedure using predetermined name (e.g., adhocGraphExample).

In some implementations, the method 800 may include executing, using one or more another graph data stored in the graph database, the stored generated procedure. The other graph data may be different from the graph data that may have been used during previous call of the procedure.

In some implementations, the generated procedure may be generated using one or more graph workspace objects. Further, the graph data may include at least one of the following: one or more vertices, one or more edges, and any combination thereof.

In some implementations, the method may further include executing one or more graph algorithms using the one or more graph data objects. The graph algorithms may include at least one of the following: a user-defined graph algorithm, a built-in graph algorithm, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows illustrated in the accompanying figures and/or described herein do not necessarily require the particular order shown, or sequential order, to achieve desirable results. Other implementations can be within the scope of the following claims.

What is claimed:

1. A computer-implemented method, comprising:
   generating one or more graph data tables;
   generating a procedure having a predetermined name,
      wherein one or more inputs to the generated procedure includes the generated one or more graph data tables, the generated procedure including one or more graph objects, the one or more graph data tables being configured to be input to the one or more graph objects, wherein the generated procedure is generated using one or more reusable workspace objects;

storing the generated procedure; and executing, using one or more graph data stored in a graph database, the stored generated procedure, wherein the executing including reusably executing the stored generated procedure using at least another graph data stored in the graph database.

2. The method according to claim 1, wherein the executing further comprises inserting the graph data stored in the graph database into the one or more generated graph tables; and executing the stored generated procedure using the inserted graph data.

3. The method according to claim 1, wherein the one or more graph data tables includes at least one of the following: one or more vertex tables, one or more edge tables, and any combination thereof.

4. The method according to claim 1, wherein the executing further comprises calling the stored generated procedure using predetermined name.

5. The method according to claim 1, further comprising executing, using one or more another graph data stored in the graph database, the stored generated procedure, wherein the one or more another graph data being different from the one or more graph data.

6. The method according to claim 1, wherein the generated procedure is generated using one or more graph workspace objects.

7. The method according to claim 1, wherein the graph data includes at least one of the following: one or more vertices, one or more edges, and any combination thereof.

8. The method according to claim 1, further comprising executing one or more graph algorithms using the one or more graph data objects.

9. The method according to claim 8, wherein the one or more graph algorithms include at least one of the following: a user-defined graph algorithm, a built-in graph algorithm, and any combination thereof.

10. A system comprising:

at least one programmable processor; and a non-transitory machine-readable medium storing instructions that, when executed by the at least one programmable processor, cause the at least one programmable processor to perform operations comprising:

generating one or more graph data tables;

generating a procedure having a predetermined name, wherein one or more inputs to the generated procedure includes the generated one or more graph data tables, the generated procedure including one or more graph objects, the one or more graph data tables being configured to be input to the one or more graph objects, wherein the generated procedure is generated using one or more reusable workspace objects;

storing the generated procedure; and executing, using one or more graph data stored in a graph database, the stored generated procedure, wherein the executing including reusably executing the stored generated procedure using at least another graph data stored in the graph database.

11. The system according to claim 10, wherein the executing further comprises inserting the graph data stored in the graph database into the one or more generated graph tables; and executing the stored generated procedure using the inserted graph data.

12. The system according to claim 10, wherein the one or more graph data tables includes at least one of the following: one or more vertex tables, one or more edge tables, and any combination thereof.

13. The system according to claim 10, wherein the executing further comprises calling the stored generated procedure using predetermined name.

14. The system according to claim 10, wherein the operations further comprise executing, using one or more another graph data stored in the graph database, the stored generated procedure, wherein the one or more another graph data being different from the one or more graph data.

15. The system according to claim 10, wherein the generated procedure is generated using one or more graph workspace objects.

16. The system according to claim 10, wherein the graph data includes at least one of the following: one or more vertices, one or more edges, and any combination thereof.

17. The system according to claim 10, wherein the operations further comprise executing one or more graph algorithms using the one or more graph data objects.

18. The system according to claim 17, wherein the one or more graph algorithms include at least one of the following: a user-defined graph algorithm, a built-in graph algorithm, and any combination thereof.

19. A computer program product comprising a non-transitory machine-readable medium storing instructions that, when executed by at least one programmable processor, cause the at least one programmable processor to perform operations comprising:

generating one or more graph data tables;

generating a procedure having a predetermined name, wherein one or more inputs to the generated procedure includes the generated one or more graph data tables, the generated procedure including one or more graph objects, the one or more graph data tables being configured to be input to the one or more graph objects, wherein the generated procedure is generated using one or more reusable workspace objects;

storing the generated procedure; and executing, using one or more graph data stored in a graph database, the stored generated procedure, wherein the executing including reusably executing the stored generated procedure using at least another graph data stored in the graph database.

20. The computer program product according to claim 19, wherein the executing further comprises inserting the graph data stored in the graph database into the one or more generated graph tables; and executing the stored generated procedure using the inserted graph data.

* * * * *